United States Patent
Pan et al.

(10) Patent No.: US 9,916,191 B1
(45) Date of Patent: Mar. 13, 2018

(54) TECHNIQUES FOR EFFICIENTLY PERFORMING A FILESYSTEM CONSISTENCY CHECK

(71) Applicant: EMC Corporation, Hopkinton, MA (US)

(72) Inventors: Hao Pan, Shanghai (CN); Feng Zhang, Shanghai (CN); Kenny Zhou, Shanghai (CN); Yi Wang, Shanghai (CN); Kent J. Costa, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 476 days.

(21) Appl. No.: 14/576,450

(22) Filed: Dec. 19, 2014

(51) Int. Cl.
  *G06F 11/07* (2006.01)
  *G06F 17/30* (2006.01)

(52) U.S. Cl.
  CPC ...... *G06F 11/0763* (2013.01); *G06F 17/3007* (2013.01)

(58) Field of Classification Search
  CPC combination set(s) only.
  See application file for complete search history.

(56) References Cited

U.S. PATENT DOCUMENTS

| | | | |
|---|---|---|---|
| 6,484,186 B1 * | 11/2002 | Rungta | G06F 11/1466 |
| 8,301,673 B2 * | 10/2012 | Hyer, Jr. | G06F 3/0614 |
| | | | 707/769 |
| 9,069,682 B1 | 6/2015 | Veeraswamy | |
| 9,146,921 B1 | 9/2015 | Vempati et al. | |
| 9,152,353 B1 | 10/2015 | Wang et al. | |

* cited by examiner

*Primary Examiner* — Etienne P Leroux
(74) *Attorney, Agent, or Firm* — BainwoodHuang (57) ABSTRACT

A method of efficiently checking a filesystem for errors is provided, the filesystem including a set of data blocks and a set of VBPs, the set of VBPs arranged in a set of VBP blocks, each VBP block storing a plurality of the VBPs. The method includes multiple stages, one stage including iterating through VBP blocks of the filesystem to generate a validity bitmap, and a later stage including traversing a block pointer structure associated with each of a set of files of the filesystem, the traversal making reference to the validity bitmap.

16 Claims, 4 Drawing Sheets

TECHNIQUES FOR EFFICIENTLY PERFORMING A FILESYSTEM CONSISTENCY CHECK

BACKGROUND

Data storage systems are used to store large quantities of data on arrays of persistent storage devices. The storage is often arranged into various layers. In some arrangements, a container filesystem layer stores files which represent logical disks at a higher layer.

A filesystem consistency check (FSCK) operation can be run on a filesystem to determine if there are any errors in the structure of the filesystem. An FSCK operation can also be run on a container filesystem to determine if there are any errors within any of logical disks contained therein. The FSCK operation typically proceeds by traversing pointers in an inode of the filesystem and checking the various pointed-to data blocks to ensure consistency.

SUMMARY

Unfortunately, the above-described techniques may suffer from deficiencies when an FSCK operation is performed on a filesystem that utilizes an abstraction layer between the pointers and the data blocks. Some filesystems utilize virtual block pointers (VBPs), which point to data blocks and are pointed to by the inode pointer structure of a file. This technique is useful when a single data block is used to represent storage for multiple logical addresses, such as, for example, when deduplication (or, in some implementations, snapshotting) is enabled. Thus, if two or more data blocks within a filesystem are identical, only one instance may be stored, pointed to by an owner VBP of that data block. The other instance of that data block may instead be represented by a VBP that points to the owner VBP of that data block. Several of these VBPs may be stored within a single block of storage. This use of pointers between VBPs may lead to a situation in which, when traversing the inodes of the filesystem, VBPs stored within the same block are accessed many different times while traversing the inodes of the filesystem. For a large filesystem, it is often impractical to keep all VBPs and their associated metadata of that filesystem within memory throughout the FSCK operation, since the total size may exceed the amount of available memory. Thus, typically, blocks of VBPs and metadata for those VBPs are typically cached temporarily while in use. However, since VBPs stored within the same block are accessed at different times, cache misses are likely to occur, leading to the same blocks of VBPs being read from disk multiple times, which is inefficient. Moreover, since part of the process of checking each VBP typically includes performing a cyclic redundancy check or a checksum operation and comparing the result with a value stored in the metadata, similar thrashing can occur with respect to the metadata.

Thus, it would be desirable to implement an improved FSCK technique that reduces thrashing. This improvement may be accomplished by performing the FSCK in two stages. The first stage includes checking, in an ordered fashion, the VBPs of the filesystem for consistency and distinguishing valid VBPs from invalid VBPs using a validity bitmap. The second stage includes traversing the inodes of the filesystem with reference to the validity bitmap, thereby avoiding the need to recheck the CRC or checksum in a manner that leads to thrashing. Since in the first stage the VBPs are checked in an ordered fashion, the blocks of VBPs and associated metadata are accessed in temporal proximity, minimizing the chances of a cache miss, which reduces thrashing.

One embodiment of the improved technique is directed to a method of efficiently checking a filesystem for errors, the filesystem including a set of data blocks and a set of VBPs, the set of VBPs arranged in a set of VBP blocks, each VBP block storing a plurality of the VBPs. The method includes (a) iterating through the set of VBP blocks and, for each VBP block of the set of VBP blocks (1) calculating a check value for that VBP block, (2) comparing the calculated check value for that VBP block with an expected check value for that VBP block as stored in metadata that describes that VBP block, (3) for VBP blocks for which the comparison fails, marking, within a validity bitmap, entries corresponding to all VBPs in those VBP blocks as invalid, and (4) for VBP blocks for which the comparison succeeds, for each owner VBP stored within those VBP blocks, performing a consistency check on that owner VBP, the consistency check yielding a valid or invalid validity result, and marking, within the validity bitmap, an entry corresponding to that owner VBP indicating the validity result from the consistency check for that owner VBP, wherein an owner VBP is a VBP that points directly to a data block rather than to another VBP. Subsequently the method includes (b) after iterating through the set of VBP blocks, traversing a block pointer structure associated with each of a set of files of the filesystem, each block pointer structure pointing to a set of owner VBPs that indicate which data blocks of the filesystem are part of a file, and (c) returning an error based on whether any of the owner VBPs pointed to by any of the traversed block pointer structures correspond to an entry within the validity bitmap marked as invalid. Other embodiments are directed to a system, a computerized apparatus, and a computer program product for performing methods similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to improved filesystem check (FSCK) techniques which reduce thrashing. This improvement may be accomplished by performing the FSCK in two stages. The first stage includes checking, in an ordered fashion, the VBPs of the filesystem for consistency and distinguishing valid VBPs from invalid VBPs using a validity bitmap. The second stage includes traversing the inodes of the filesystem with reference to the validity bitmap, thereby avoiding the need to recheck the CRC or checksum in a manner that leads to thrashing. Since in the first stage the VBPs are checked in an ordered fashion, the blocks of VBPs and associated metadata are accessed in temporal proximity, minimizing the chances of a cache miss, which reduces thrashing.

Figure 1:
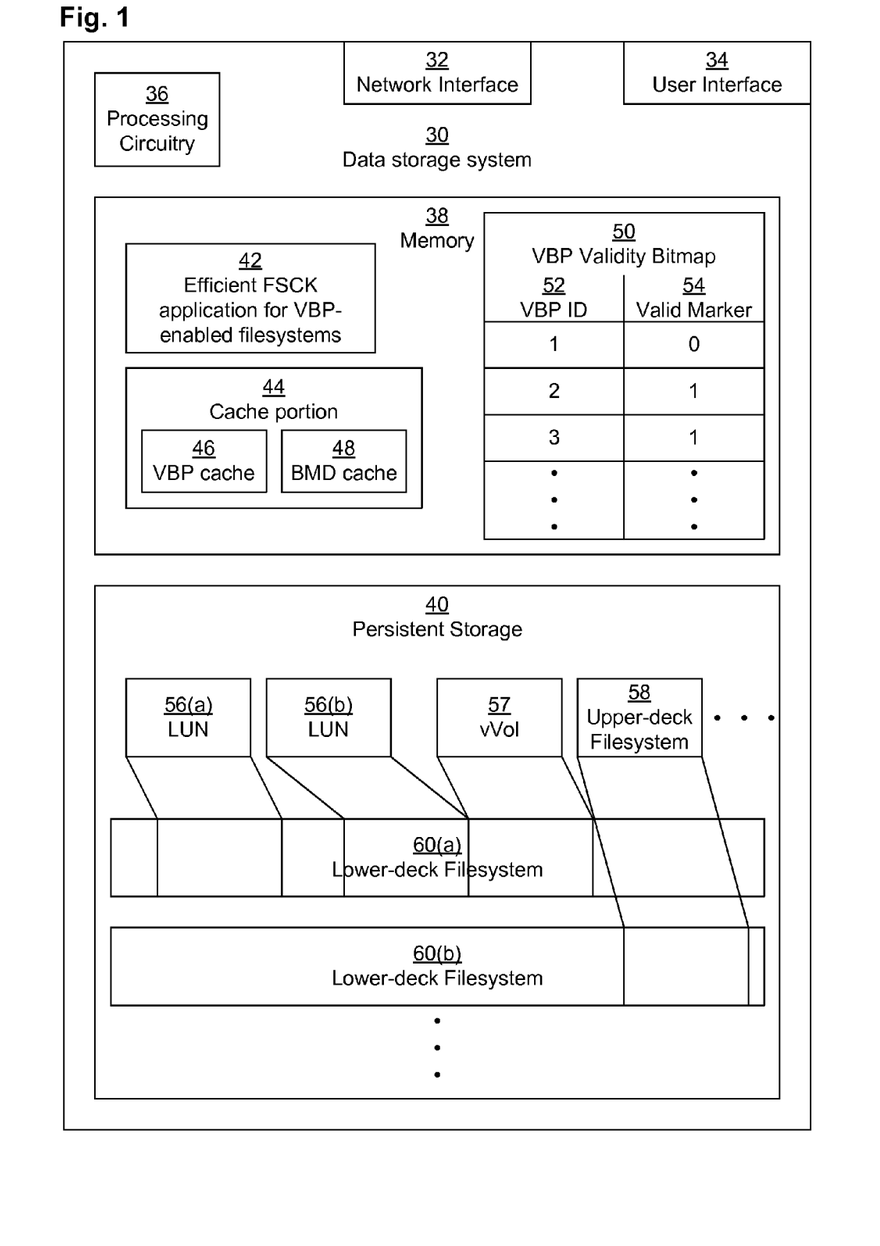
FIG. 1 is a block diagram depicting an example data storage system according to various embodiments.

FIG. 1 depicts an example data storage system (DSS) 30. In an example embodiment, DSS 30 is a data storage array, such as, for example, a VNX®, VNXe®, or CLARiiON® CX4 data storage array provided by the EMC Corporation of Hopkinton, Mass. It should be understood, however, that, in some embodiments, DSS 30 may be any kind of computing device that provides storage, such as, for example, a personal computer, a workstation computer, a server computer, an enterprise server computer, a laptop computer, a tablet computer, a smart phone, etc.

DSS 30 includes a processing circuitry 36, system memory 38, and persistent storage 40. In some embodiments, DSS 30 also includes network interface circuitry 32 for communicating with one or more host devices configured to send data storage commands to the DSS 30 as well as user interface circuitry 34 for communicating with a user via user input/output devices (e.g., display screens, keyboards, mice, printers, touch sensitive screens, track pads, etc.). Network interface circuitry 32 may include one or more Ethernet cards, cellular modems, Wireless Fidelity (WiFi) wireless networking adapters, Fibre Channel adapters, InfiniBand adapters, any other devices for connecting to a network, or some combination thereof.

Processing circuitry 36 may include any kind of processor or set of processors configured to perform computerized operations, such as, for example, a microprocessor, a multi-core microprocessor, a digital signal processor, a system on a chip, a collection of electronic circuits, a similar kind of controller, or any combination of the above. Processing circuitry 36 may also include circuitry configured to control the persistent storage 40.

Memory 38 may be any kind of digital system memory, such as, for example, random access memory (RAM). Memory 38 stores an operating system in operation (not depicted, e.g., Linux, UNIX, Windows, or a similar operating system), various storage system management programs in operation (not depicted), and one or more applications executing on processing circuitry 36 as well as data used by those applications. One such application is efficient filesystem check (FSCK) application 42 for VBP-enabled filesystems. Memory 38 may also include a cache portion 44 for temporary storage of data while in use. Cache portion may include a virtual block pointer (VBP) cache for caching VBPs and a block metadata (BMD) cache 48 for caching block metadata. While operating improved FSCK application 42, memory 38 may also store VBP Validity bitmap 50, which stores a set of validity marker bits 54, each of which maps to a VBP identifier 52. It should be noted that although the VBP validity bitmap 50 is depicted as including a column of VBP identifiers 52, this depiction is for illustrative purposes only; in a typical arrangement, VBP validity bitmap 50 is arranged as a bitmap, such that the position of a bit within the bitmap defines which VBP it refers to. It should also be noted that, although the VBP validity bitmap 50 is illustrated and described as being stored within memory 38, in some embodiments, the VBP validity bitmap 50 may instead be stored within persistent storage 40 (e.g., within a dedicated swap space) or some combination of memory 38 and persistent storage 40.

It should be understood that network interface circuitry 32, user interface circuitry 34, processing circuitry 36, and memory 38 may all interconnect with one another, and they all may reside on a storage processor board or motherboard of the DSS 30. There may be multiple independent storage processor boards per DSS 30, arranged in a highly-available, fault-tolerant manner.

Persistent storage 40 may be made up of a set of persistent storage devices, such as, for example, hard disk drives, solid-state storage devices, flash drives, etc. Persistent storage 40 is configured to store data arranged into VBP-enabled filesystems, such as lower-deck filesystems 60 (depicted as lower-deck filesystems 60(a), 60(b), . . . ). Logical disks, such as LUNs 56, virtual volumes (vVols) 57, upper-deck filesystems 58, and snapshots (not depicted), may be logically arranged on the various lower-deck filesystems 60.

Figure 2:
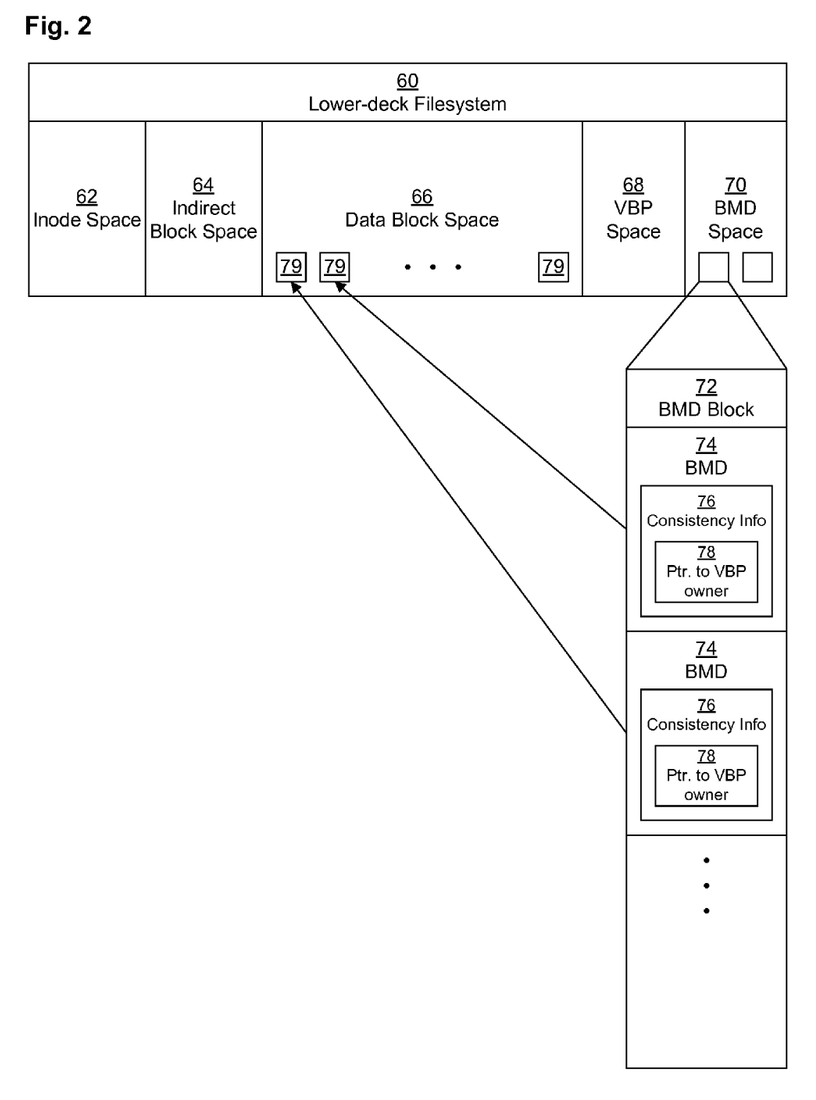
FIG. 2 is a block diagram depicting an example filesystem structure according to various embodiments.

FIG. 2 illustrates an example VBP-enabled lower-deck filesystem 60 according to various embodiments. Lower-deck filesystem 60 typically includes a sparsely-populated address space, divided into several sub-spaces, 62, 64, 66, 68, 70. Thus, for example, inode space 62 may have an address space range of zero to $2^{28}-1$ (268, 345, 455) bytes, while indirect block space may have an address space range of $2^{32}$ to $2^{33}$ bytes, etc.

Inode space 62 includes blocks of inodes. Indirect block space 64 includes indirect blocks, which are pointed to by inodes of the inode space 62. These inode blocks, in-turn, point either to other indirect blocks within indirect block space 64 or to data blocks 79 within data block space 66. However, since filesystem 60 is VBP-enabled, instead of the inodes and indirect blocks pointing directly to data blocks 79, the inodes and indirect blocks point to the data blocks 79 indirectly via pointing to intervening VBPs from the VBP space 68. An inode defines the boundaries of a file, as is well-known in the art. Typically, each inode includes several direct pointers to VBPs that point to data blocks 79 as well as several indirect pointers that point to indirect blocks that either point to VBPs that point to data blocks 79 or to other indirect blocks.

Figure 3:
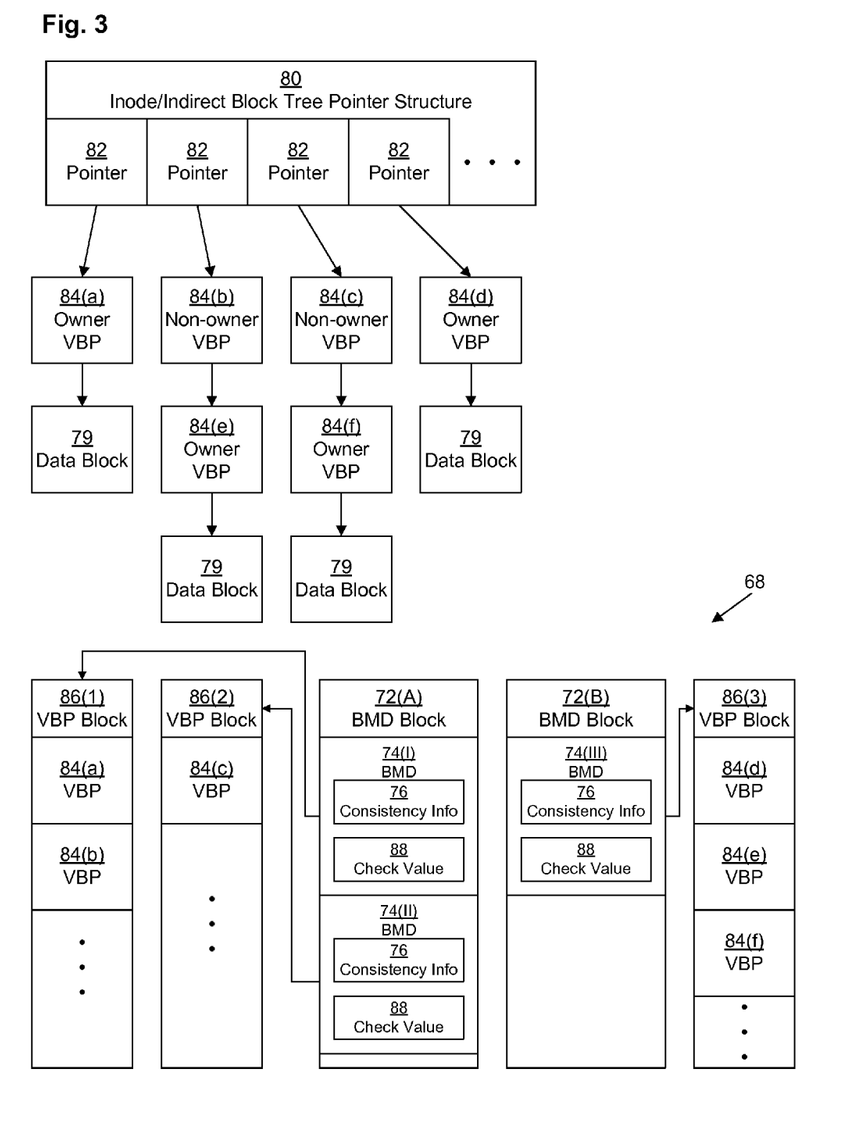
FIG. 3 is a block diagram depicting an example structure of elements of a filesystem according to various embodiments.

Thus, with reference to FIG. 3, each inode within the inode space 62, together with any indirect blocks that it points to, defines an inode/indirect block tree pointer structure 80. Although this pointer structure 80 has a tree structure, it is depicted within FIG. 3 as having a flat structure, for illustrative simplicity, since the tree structure is well-known in the art. Thus, inode/indirect block tree pointer structure 80 includes a set of pointers 82 that each point to a particular VBP 84. Some of these VBPs 84 (e.g., VBPs 84(a) and 84(d)) point directly to data blocks 79 of the file whose boundaries are defined by the inode/indirect block tree pointer structure 80. Other of these VBPs (e.g., VBPs 84(b) and 84(c)) point to other VBPs 84 (e.g., VBPs 84(e) and 84(f)), which in turn point to the data blocks 79 of the file. An owner VBP 84(a), 84(d), 84(e), 84(f) is a VBP 84 which points directly to a data block 79, while a non-owner VBP 84(b), 84(c) is a VBP 84 which points to something other than a data block 79, e.g., to another VBP 84. In some embodiments, VBPs 84 may be implemented as virtual block map entries (VBMs).

In some embodiments, filesystem 60 also includes a BMD space 70 (which may sometimes be referred to as a "shadow space") for storing block metadata associated with blocks of the filesystem. Typically, there is a block metadata entry (BMD) 74 for each block in the filesystem (e.g., each inode block, each indirect block, each data block 79, and each VBP block 86). In some embodiments, BMD space 70 stores BMDs 74 for data blocks 79 of data space 66, but BMDs 74 for other each of the other spaces 62, 64, 68 are stored within each respective space (e.g., at the beginning of each respective space). In some embodiments, each space 62, 64, 68 may be logically divided into cylinder groups (CGs, e.g., chunks of consecutive addresses that are 64 megabytes long), each CG having BMDs 74 for blocks of that CG at the beginning (or end) of that CG. In other embodiments, there is no dedicated BMD space 70, but rather BMDs 74 for each of the other spaces 62, 64, 66, 68 are stored within (typically at the beginning) each respective space. Thus, BMDs 74 for inode blocks are stored at the beginning of CGs of inode space 62, BMDs 74 for indirect blocks are stored at the beginning of CGs of indirect space 64, BMDs 74 for data blocks 79 are stored at the beginning of CGs of data block space 66, and BMDs 74 for VBP blocks 86 are stored at the beginning of CGs of VBP space 68.

With reference to FIG. 2, certain BMDs 74, such as BMDs for data blocks 79, include consistency information 76 for their respective data blocks 79. In one embodiment, this consistency information 76 includes a pointer 78 to a VBP owner of that respective data block 79. The VBP owner of a data block is a particular VBP 84 which points to that data block 79. In certain cases (e.g., when deduplication is enabled), a single data block 79 may be part of several files or it may be repeated at several locations within a single file. Thus, in FIG. 3, VBPs 84(*a*), 84(*d*), 84(*e*), and 84(*f*) are owner VBPs of the respective data blocks 79 that they point to. However, VBPs 84(*b*) and 84(*c*) are not owner VBPs, but rather point to other VBPs 84(*e*) and 84(*f*), respectively.

With reference to FIG. 3, multiple VBPs 84 within VBP space 68 are arranged into VBP blocks 86. In one embodiment, each VBP block 86 is eight kilobytes in size and includes 102 VBPs. VBPs 84 for adjacent blocks within a file may be dispersed between various VBP blocks 86. Thus, as depicted, VBPs 84(*a*) and 84(*b*) are located within VBP block 86(1), VBP 84(*c*) is located within VBP block 86(2), and VBPs 84(*d*), 84(*e*), and 84(*f*) are located within VBP block 86(3). Certain BMDs 74, such as BMDs 74 for VBP blocks 86 may include a check value 88. Check value 88 is a value that represents the data included within the VBP block 86 pointed to by a BMD 74. For example, in one embodiment, check value 88 may be a checksum of the VBP block 86. In another embodiment, check value 88 may be a cyclic redundancy check (CRC) value for the VBP block 86, as is well-known in the art. In some embodiments, check values 88 may also be stored within BMDs 74 for other kinds of blocks, such as, for example, data blocks 79.

Multiple BMDs 74 may be arranged into BMD blocks 72. As depicted, BMD 74(I) is stored within BMD block 72(A) and refers to VBP block 86(1), BMD 74(II) is stored within BMD block 72(A) and refers to VBP block 86(2), and BMD 74(III) is stored within BMD block 72(B) and refers to VBP block 86(3). In a typical embodiment each BMD block 72 is eight kilobytes in size, storing sixteen 512-byte BMDs 74.

Figure 4:
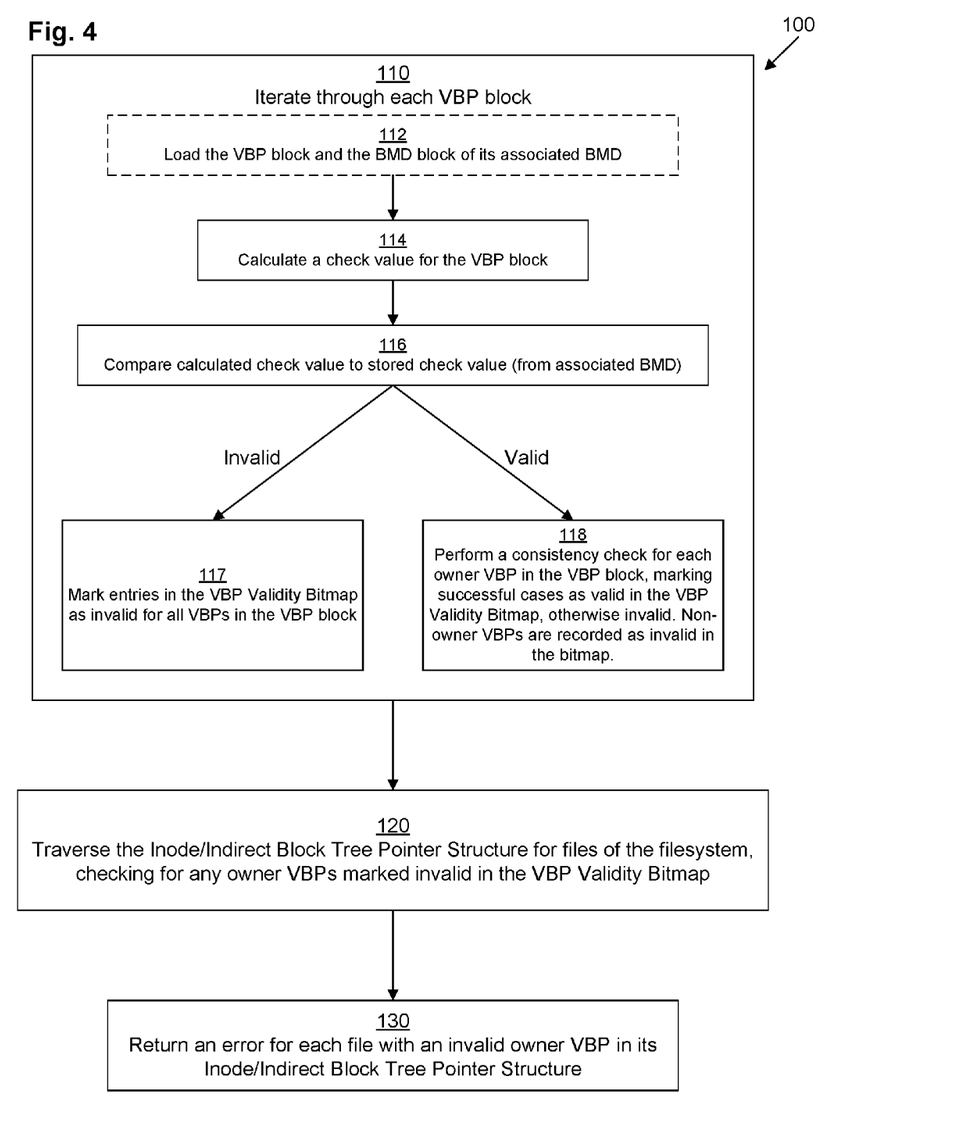
FIG. 4 is a flowchart depicting an example method according to various embodiments.

FIG. 4 illustrates an example method 100 according to various embodiments for efficiently performing a FSCK operation in a VBP-enabled filesystem 60 with reduced thrashing. It should be understood that any time a piece of software, such as, for example, improved FSCK application 42, is described as performing a method, process, step, or function, in actuality what is meant is that a computing device (e.g., DSS 30) on which that piece of software 42 is running performs the method, process, step, or function when executing that piece of software on its processing circuitry 36.

It should be understood that, within FIG. 4, sub-step 112 is dashed because it may be optional and not fundamental to method 100. However, it should be understood that, in some embodiments, one or more of the other steps and sub-steps may be omitted. Similarly, in some embodiments, one or more steps or sub-steps may be combined together or performed in a different order.

Method 100 is typically performed by FSCK application 42 with respect to a particular lower-deck filesystem 60. FSCK application 42 may be invoked by a user via user interface circuitry 34 (e.g., by typing "FSCK" into a command line interface) or it may be invoked automatically by a filesystem management application. In some embodiments, method 100 can also be performed over a filesystem other than a lower-deck filesystem 60, as long as it is VBP-enabled.

In step 110, FSCK application 42 iterates through all the VBP blocks 86 of the VBP space 68, and performs sub-steps 112-118. This iteration may not necessarily include every possible VBP block 86 within the address space of the VBP space 68, however, since it may be sparsely-populated or thinly-provisioned. Thus, in one embodiment, 256 MB slices (not depicted) may be allocated to VBP space 68 as needed. Only the VBP blocks 86 within the allocated slices are iterated over. In some embodiments, only VBP blocks 86 within allocated CGs are iterated over.

Step 110 is typically performed in an ordered fashion. Thus, the iteration checks all of the VBPs 84 within one VBP block 86 prior to moving on to checking VBPs 84 from another VBP block 86. Typically, this iteration within the VBP block 86 checks the VBPs 84 in the order in which they are stored within the VBP block 86. In addition, in some embodiments, the iteration checks the VBPs 84 from VBP blocks 86 that have BMDs 74 within the same BMD block 72 prior to moving on to checking VBPs 84 from VBP blocks 86 that have BMDs 74 within other BMD blocks 72. In some embodiments, the VBPs 84 are checked in the order in which they are stored within persistent storage (based on their addresses), the BMDs 74 within the BMD blocks 72 being arranged to represent consecutive VBP blocks 86 as well.

In sub-step 112, FSCK application 42 loads the VBP block 86 as well as its associated block metadata into memory 38, typically within cache 44. This loading step is not performed if the appropriate data is already in the cache 44. Thus, when iterating over VBPs 84(*a*), 84(*b*) in VBP block 86(1), in sub-step 112, FSCK application 42 may load VBP block 86(1) into VBP cache 46 and BMD block 72(A) into BMD cache 48. When iterating over VBPs 84(*c*) in VBP block 86(2), in sub-step 112, FSCK application 42 may load VBP block 86(2) into VBP cache 46, however, since BMD block 72(A) has already been loaded into BMD cache 48, it would not be reloaded (unless it had already been evicted from the BMD cache 48).

In sub-step 114, FSCK application 42 calculates a check value (e.g., a checksum or CRC value) for the VBP block 86. In sub-step 116, FSCK application 42 compares the calculated check value to the check value 88 stored within the BMD 74 for that VBP block 86. If the results are identical, then the comparison succeeds. If the results are different, then the comparison may fail, although, in some embodiments, an attempt may be made to correct an error which may have caused the mismatch. Thus, for example, when a CRC is used as the check value, it may be possible to correct the error automatically using well-known error correction techniques. If the error is correctable, then it will be fixed and the comparison will be deemed to have succeeded.

If the comparison fails, operation proceeds to sub-step 117, while if the comparison succeeds, operation proceeds to sub-step 118.

In sub-step 117, FSCK application 42 marks every VBP 84 within the VBP block 86 as containing an error within VBP validity bitmap 50. Thus, if there are 102 VBPs 84 per 8-kilobyte VBP block 86 and 32,768 VBP blocks in a single 256 MB slice, if there is one slice allocated to VBP space 68, there may be as many as 3,342,336 valid VBPs 84. If VBP space 68 includes VBP BMD blocks 72, however, there may be fewer VBPs 84. Assuming 3,342,336 valid VBPs 84, VBP validity bitmap 50 may have as many as 3,342,336 validity markers 54, each one bit in size (which may be numbered zero through 3,342,335) for a total size of 417,792 bytes. Thus, if the comparison fails, in sub-step 116, for the first VBP block (e.g., VBP block 86(1)), then FSCK application, in sub-step 117, may mark a zero for the first 102 bits of the VBP validity bitmap 50. In some embodiments, there may be a default marking of zero, in which case, this marking step will be trivial.

In sub-step 118, FSCK application 42 performs additional checks on individual VBPs 84 of the VBP block 86, such as a consistency check. FSCK application 42 is then able to individually mark each owner VBP 84 (e.g., 84(a), 84(d), 84(e), 84(f)) as valid or invalid in its corresponding entry in the VBP validity bitmap 50, while marking all non-owner VBPs 84 (e.g., 84(b), 84(c)) as invalid. Thus, for example, if VBP block 86(2) is the second VBP block 86 within VBP space 68 and if VBP block 86(2) has passed its CRC check (sub-step 116) and the first VBP 84(c) therein is a non-owner VBP, then the VBP validity bitmap 50 will be set to zero for that VBP 84(c) (at bit #102 of the VBP validity bitmap 50) because it is not an owner VBP. If, continuing in the example, VBP block 86(3) is the third VBP block 86 within VBP space 68 and if VBP block 86(3) has passed its CRC check (sub-step 116) and the first owner VBP 84(d) in VBP block 86(3) passes a consistency check, then bit #204 of the VBP validity bitmap 50 will be marked one. Similarly, if the second owner VBP 84(e) in VBP block 86(3) fails a consistency check, then bit #205 of the VBP validity bitmap 50 will be marked zero.

In one embodiment, FSCK application 42 performs a consistency check on each owner VBP 84 by first determining which data block 79 it points to. (If the VBP 84 is not the owner VBP of a data block 79 within the address space of data block space 66, the VBP 84 will only point to the data block 79 indirectly at the end of a chain of pointers, see FIG. 2, so it will be marked zero in the VBP validity bitmap 50.) If the address of the data block 79 pointed to by the owner VBP 84 is valid, FSCK application 42 loads the BMD 74 for that data block 79 and examines the pointer 78 to the owner VBP for that data block 79 as stored within the consistency information 76 of the BMD 74. This pointer 78 to the owner VBP should point to the owner VBP 84 under check. If the stored pointer 78 to the owner VBP does not point to the proper VBP 84, then the consistency check will fail.

In some embodiments, additional consistency check operations may also be performed according to well-known techniques.

Typically, the consistency checks of sub-step 118 are avoided when sub-step 117 is performed, although, in some embodiments, the consistency checks may be performed anyway, although the markings within the VBP validity bitmap 50 will not be affected. In such cases, the results may still be logged for later viewing by a system administrator.

In step 120, which is performed after the VBP validity bitmap 50 has been filled out, FSCK application 42 traverses the inode/indirect block tree pointer structure 80 for files of the filesystem 60 and checks for invalid marks within the VBP validity bitmap 50 that relate to VBPs 84 pointed to by the inode/indirect block tree pointer structure 80. Typically, step 120 is performed for each inode of the filesystem 60, although in some embodiments, only a subset of the inodes may be checked.

While traversing the inode/indirect block tree pointer structure 80 for any given file, FSCK application 42 loads the VBP 84 that is pointed to by each pointer 82 and checks whether it points directly to a data block 79, in which case that VBP 84 is an owner VBP, or whether it does not point directly to a data block 79 (e.g., it points to another VBP 84), in which case that VBP 84 is a non-owner VBP. For each owner VBP, FSCK application 42 is able to make reference to the VBP validity bitmap 50 to determine if that owner VBP is valid. For each non-owner VBP, FSCK application 42 traverses the chain of pointers to the VBP 84 pointed to by that non-owner VBP, until an owner VBP is reached, in which case that owner VBP can be checked within the VBP validity bitmap 50 for validity.

Although the VBPs 84 are loaded in step 120, there is no need to perform a CRC or checksum check on any of the VBPs 84 (avoiding the need to load their associated BMDs 74 from persistent storage 40 into cache 44), since that was already performed in step 110 and the result recorded in VBP validity bitmap 50.

In step 130, FSCK application 42 returns an error for each inode/indirect block tree pointer structure 80 which points (either directly or indirectly through a chain) to an owner VBP marked as having an error in the VBP validity bitmap 50. In some embodiments, instead of reporting errors on a per-inode basis, a single error may be reported for the entire filesystem 60 if any inode/indirect block tree pointer structure 80 traversed in step 120 yields an error. In other embodiments, every single VBP 84 marked as having an error in the VBP validity bitmap 50 that is encountered within the traversal of step 120 is reported separately. In some embodiments, the errors are only reported on a per-inode basis, but a log file records all of the individual errors found.

The errors in step 130 may be reported to a user over user interface circuitry 34. A reported consistency error for any given inode may be interpreted as an error in the logical disk (e.g., LUN 56 or the logical disk upon which a vVol 57, upper-deck filesystem 58, or snapshot rests) that the inode represents.

Thus, techniques have been described for performing an efficient FSCK method 100 in multiple passes that reduces the number of cache misses when the filesystem 60 it is applied to is highly-fragmented or otherwise contains pointers 82 to VBPs 84 that are very out of order. Since the VBPs 84 are checked in the first pass in the order that they are stored on disk, each VBP BMD block 72 will typically only have to be loaded into cache 44 once, reducing the chance of thrashing.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

In addition, it should be understood that all embodiments which have been described may be combined in all possible combinations with each other, except to the extent that such combinations have been explicitly excluded.

What is claimed is:

1. A method of efficiently checking a filesystem for errors, the filesystem including a set of data blocks and a set of virtual block pointers (VBPs), the set of VBPs arranged in a set of VBP blocks, each VBP block storing a plurality of the VBPs, the method comprising:
iterating through the set of VBP blocks and, for each VBP block of the set of VBP blocks:
loading that VBP block from the filesystem into cache;
loading metadata that describes that VBP block from the filesystem into cache unless the metadata that describes that VBP block is already present in the cache;
calculating a check value for that VBP block;
comparing the calculated check value for that VBP block with an expected check value for that VBP block as stored in the cached metadata that describes that VBP block;
for VBP blocks for which the comparison fails, marking, within a validity bitmap, entries corresponding to all VBPs in those VBP blocks as invalid; and
for VBP blocks for which the comparison succeeds, for each owner VBP stored within those VBP blocks, performing a consistency check on that owner VBP, the consistency check yielding a valid or invalid validity result, and marking, within the validity bitmap, an entry corresponding to that owner VBP indicating the validity result from the consistency check for that owner VBP, wherein an owner VBP is a VBP that points directly to a data block rather than to another VBP;
after iterating through the set of VBP blocks, traversing a block pointer structure associated with each of a set of files of the filesystem, each block pointer structure pointing to a set of owner VBPs that indicate which data blocks of the filesystem are part of a file; and
returning an error based on whether any of the owner VBPs pointed to by any of the traversed block pointer structures correspond to an entry within the validity bitmap marked as invalid.

2. The method of claim 1 wherein for VBP blocks for which the comparison succeeds, for each owner VBP stored within those VBP blocks, performing the consistency check on that owner VBP includes:
reading metadata associated with a data block directly pointed to by that owner VBP to identify a recorded owner VBP of that data block;
for VBP blocks for which the identified recorded owner VBP of the data block pointed to by that owner VBP is the same as that owner VBP itself, yielding a valid result; and
otherwise, yielding an invalid result.

3. The method of claim 1 wherein iterating through the set of VBP blocks is performed in an order such that VBP blocks having metadata in adjacent locations are loaded in temporal proximity to each other.

4. The method of claim 1 wherein returning the error based on whether any of the owner VBPs pointed to by any of the traversed block pointer structures correspond to an entry within the validity bitmap marked as invalid includes returning a set of errors, the errors of the set of errors respectively indicating which files of the filesystem are associated with a block pointer structure which points to at least one owner VBP that corresponds to an entry within the validity bitmap marked as invalid.

5. The method of claim 4 wherein:
the filesystem is a container filesystem, each file of the container filesystem representing a logical disk; and
an error for a file of the container filesystem indicates that there is an error within the logical disk.

6. The method of claim 5 wherein the logical disk provides a realization of one of:
a block-based logical disk (LUN);
an upper-deck filesystem;
a virtual volume (vVol); and
a snapshot of a previous state of one of the above.

7. The method of claim 6 wherein at least a first VBP pointed to by the block pointer structure of a first file of the container filesystem points to a second VBP also pointed to by the block pointer structure of a second file of the container filesystem, the first file representing a LUN and the second file representing a snapshot of a previous state of the LUN.

8. The method of claim 5 wherein deduplication is enabled for at least one file of the container filesystem, at least a first VBP pointed to by the block pointer structure of the file pointing to a second VBP also pointed to by the block pointer structure.

9. The method of claim 4 wherein deduplication is enabled for the container filesystem, at least a first VBP pointed to by the block pointer structure of a first file of the container filesystem pointing to a second VBP also pointed to by the block pointer structure of a second file of the container filesystem.

10. The method of claim 5 wherein:
the container filesystem is thinly-provisioned; and
iterating through the set of VBP blocks includes iterating only through VBP blocks that have already been allocated to the container filesystem.

11. The method of claim 1 wherein a VBP is defined to be a data structure including a pointer to one of a data block and another VBP.

12. The method of claim 1 wherein each VBP block is loaded into the cache only once as part of checking the filesystem for errors.

13. A computer program product comprising a non-transitory computer-readable storage medium, which stores a set of instructions, which, when executed by a computing device, cause the computing device to check a filesystem for errors, the filesystem including a set of data blocks and a set of virtual block pointers (VBPs), the set of VBPs arranged in a set of VBP blocks, each VBP block storing a plurality of the VBPs, checking the filesystem for errors including:
iterating through the set of VBP blocks and, for each VBP block of the set of VBP blocks:
loading that VBP block from the filesystem into cache;
loading metadata that describes that VBP block from the filesystem into the cache unless the metadata that describes that VBP block is already present in the cache;
calculating a check value for that VBP block;
comparing the calculated check value for that VBP block with an expected check value for that VBP block as stored in the cached metadata that describes that VBP block;

for VBP blocks for which the comparison fails, marking, within a validity bitmap, entries corresponding to all VBPs in those VBP blocks as invalid; and for VBP blocks for which the comparison succeeds, for each owner VBP stored within those VBP blocks, performing a consistency check on that owner VBP, the consistency check yielding a valid or invalid validity result, and marking, within the validity bitmap, an entry corresponding to that owner VBP indicating the validity result from the consistency check for that owner VBP, wherein an owner VBP is a VBP that points directly to a data block rather than to another VBP;

after iterating through the set of VBP blocks, traversing a block pointer structure associated with each of a set of files of the filesystem, each block pointer structure pointing to a set of owner VBPs that indicate which data blocks of the filesystem are part of a file; and returning an error based on whether any of the owner VBPs pointed to by any of the traversed block pointer structures correspond to an entry within the validity bitmap marked as invalid.

14. The computer program product of claim 13 wherein for VBP blocks for which the comparison succeeds, for each owner VBP stored within those VBP blocks, performing the consistency check on that owner VBP includes:

reading metadata associated with a data block directly pointed to by that owner VBP to identify a recorded owner VBP of that data block;

for VBP blocks for which the identified recorded owner VBP of the data block pointed to by that owner VBP is the same as that owner VBP itself, yielding a valid result; and otherwise, yielding an invalid result.

15. The computer program product of claim 13 wherein iterating through the set of VBP blocks is performed in an order such that VBP blocks having metadata in adjacent locations are loaded in temporal proximity to each other.

16. An apparatus comprising:

user interface circuitry;

persistent storage configured to store at least one filesystem including a set of data blocks and a set of virtual block pointers (VBPs), the set of VBPs arranged in a set of VBP blocks, each VBP block storing a plurality of the VBPs;

memory, the memory including cache; and processing circuitry configured to:

iterate through the set of VBP blocks and, for each VBP block of the set of VBP blocks:

load that VBP block from the filesystem into the cache;

load metadata that describes that VBP block from the filesystem into the cache unless the metadata that describes that VBP block is already present in the cache;

calculate a check value for that VBP block;

compare the calculated check value for that VBP block with an expected check value for that VBP block as stored in the cached metadata that describes that VBP block;

for VBP blocks for which the comparison fails, mark, within a validity bitmap, entries corresponding to all VBPs in those VBP blocks as invalid; and for VBP blocks for which the comparison succeeds, for each owner VBP stored within those VBP blocks, perform a consistency check on that owner VBP, the consistency check yielding a valid or invalid validity result, and mark, within the validity bitmap, an entry corresponding to that owner VBP indicating the validity result from the consistency check for that owner VBP, wherein an owner VBP is a VBP that points directly to a data block rather than to another VBP;

after iterating through the set of VBP blocks, traverse a block pointer structure associated with each of a set of files of the filesystem, each block pointer structure pointing to a set of owner VBPs that indicate which data blocks of the filesystem are part of a file; and return an error, via the user interface circuitry, based on whether any of the owner VBPs pointed to by any of the traversed block pointer structures correspond to an entry within the validity bitmap marked as invalid.

* * * * *